Dec. 19, 1967     E. A. STEINBOCK, JR     3,358,971
INVESTMENT MIXER
Filed June 21, 1965
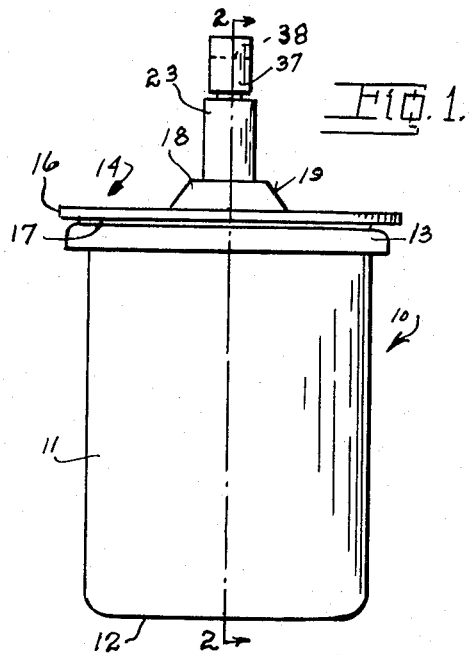
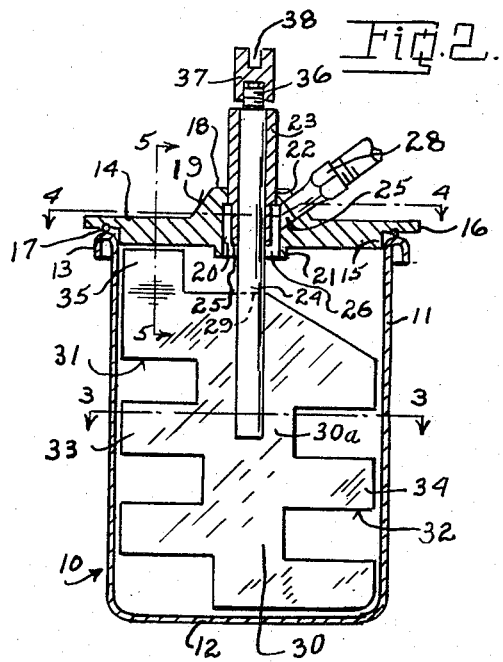
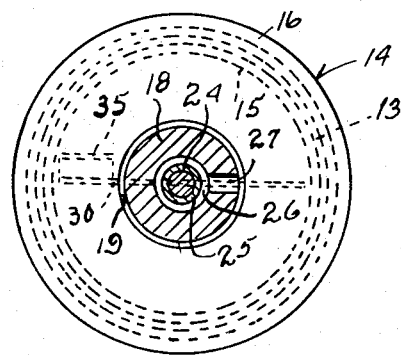
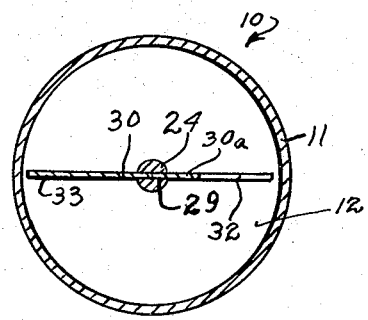
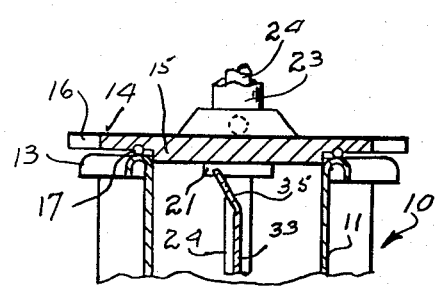
INVENTOR
EDMUND A. STEINBOCK
BY
Attorney

United States Patent Office 3,358,971
Patented Dec. 19, 1967

3,358,971
INVESTMENT MIXER
Edmund A. Steinbock, Jr., Louisville, Ky., assignor to Whip-Mix Corporation, Louisville, Ky., a corporation of Kentucky
Filed June 21, 1965, Ser. No. 465,473
6 Claims. (Cl. 259—107)

This invention relates to improvements in an investment mixer, particularly in such a device that operates with the ingredients being mixed under or in a vacuum.

Investments, such as produced or provided from a device of the present invention, are employed to form molds around dissipable patterns and the said molds, after the production of a casting therefrom, are generally destroyed. The said molds may be employed in the production of commercial castings and are also employed in the production of castings for dental restorations, which are quite small castings by comparison with the generally much larger commercial castings.

It is therefore the principal object of the present invention to provide an investment composition mixer and which will find its principal use, or be particularly employed, in a dentist's office or a dental laboratory.

Another object of this invention is the provision of an investment mixer of a type wherein the ingredients are being mixed while under vacuum conditions and which is more efficient than those heretofore employed.

A still further object of the present invention is the provision of an investment mixer and wherein the material being mixed in under a more perfect and complete vacuum than is the situation in investment mixers as heretofore and presently known and employed.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a side elevational view of an investment mixer embodying the principals of the improved vacuum mixer.

FIG. 2 is a vertical sectional view through the device of FIG. 1 as seen from line 2—2 on said FIG. 1.

FIG. 3 is a horizontal sectional view through the mixer as seen from line 3—3 on FIG. 2.

FIG. 4 is a horizontal view partly in section and partly in elevation as seen from line 4—4 on FIG. 2.

FIG. 5 is a fragmentary, vertical sectional view through a portion of FIG. 2 as seen from line 5—5 on said FIG. 2.

Throughout the several views of the drawings, similar reference characters are employed to denote the same or similar parts.

As stated above this invention relates to an investment mixer such as particularly used in dentists' offices, or dental laboratories in the formation of molds for the making of dental castings for dental restorations. The said dental restorations, or castings, are generally of a very small size and must be made as smooth and compact as possible. The water and powder from which the investment composition is formed normally has incorporated therein the air normally surrounding same and which air must be removed since it forms bubbles in the investment composition which could provide either indentations or nodules in or on the casting surfaces.

It is not uncommon to effect the mixing of the ingredients in a vacuum to draw off the said air but, as heretofore known, the investment mixers did not effect a complete job with an occasional air bubble in the mix which eventually gave trouble to the dentist or technician in fitting or placing in position the restoration casting.

The said heretofore known and used vacuum type mixers has the vacuum connected with the interior of the mixing bowl at a point eccentric to the mixing shaft, generally centrally of the bowl, and eccentric to the mixing container or bowl and it is believed that this type of arrangement was the reason for the occasional air bubble in the investment and which found a resting point on the surface of the pattern during the formation of the mold, and eventually resulted in either an indentation or nodule relative to the casting surface.

By the present invention the vacuum is applied to substantially the center of the material being mixed and to which point the air bubbles are generally projected and can readily be withdrawn from the mix.

Specifically, and as shown in the drawings, the mixer of the present invention comprises a container 10 having an upstanding wall 11 of substantially cylindrical form, the said wall is uniform in thickness throughout its height and has a bottom 12. The upper end of the container walls 11 are outwardly and downwardly formed as at 13 to provide a smooth upper end to the container and of reasonable width.

It is through the upper end 13 of this container that the powder, or the like, and water are introduced into the container for subsequent mixing.

The open end of the container 10 is closed by a top or cover 14 which has depending from its under surface a thickened body portion 15, and with said body portion 15 having a diameter to relatively snugly fit within the container 10 open upper end. The cover 14 beyond its thickened body portion 15 is in the form of a relatively thin radial flange 16 having formed inwardly of its periphery and into its lower surface a suitable groove for a compressible rubber gasket 17. In operation, the cover 14 has its gasket 17 engaging with the upper end or crown of the container rolled end 13 and thereby effects a solid connection between the parts and prevents any leakage from the exterior to the interior of the container 10, as will subsequently be made clear.

The cover 14 substantially, axially, centrally of the container 10 is provided with an upstanding circular boss 18 including an outer wall 19 that is angularly related to the upper surface of the cover body portion 15. The said boss 18 is upwardly, centrally, counter-bored from the under side of the body portion 15, as illustrated at 20. Surrounding the said counter-bore 20 the cover body portion 15 has downwardly projecting therefrom a sleeve 21. The said cover boss 18 is provided with a bore 22 downwardly of its upper surface and of a diameter somewhat less than the diameter of counter-bore 20.

The said cover 14 has pressed into the boss bore 22 the lower end of a bearing sleeve 23 in which is disposed for rotation a shaft 24. The bearing sleeve 23 is provided below the boss bore 22 with a reduced diameter portion 25 which is disposed within the cover counter-bore 20 and thereby provides around the said reduced portion a channel or passageway 26.

The cover counter-bore 20, and therefore the channel or passageway 26, provided thereby, is substantially axially, centrally, of the cover 14 and therefore the interior of the container 10.

The cover boss 18 is provided, at substantially right angles with its outer tapered side, with an aperture or bore 27 in which is removably inserted the end of a coupling or nipple 28 which in turn has connected therewith a line extending from an exhaust or vacuum forming pump not shown since such a pump is well-known.

The shaft 24 projects below the cover 14 and is provided upwardly of its lower end with a slot 29, but which slot stops a perceptible distance below the lower or free end of the sleeve 21. Disposed within the slot 29 of the shaft 24 is the mixing blade or paddle 30 which is formed of a relatively thin, though quite rigid, sheet of metal, which for convenience and obvious advantage, is aluminum. The said blade or paddle 30 is provided for the height thereof with a body portion 30a and in each side thereof the body portion is provided with notches or passageways 31 and 32, with said notches 31 being spaced vertically of one edge of the blade or paddle body portion while the notches 32 are vertically spaced relative to the other edge of the blade or paddle body portion 30a. The said notches 31 and 32 are in alternate planes vertically of the blade or paddle and with the blade or paddle material 33 between the notches 31 and the blade or paddle material 34 between the notches 32 effecting the dividing of the material being mixed into layers.

It is known that during the operation of the mixing blade the material while being pushed forwardly is also pushed outwardly toward the inner surface of the container wall 11 and the said material has a tendency to upwardly ride the said wall until it would be stopped by the under surface of the cover body portion 15. In order that the said material does not become trapped at the said upper end of the container 10, the blade or paddle 30 is provided at an upper corner thereof, as shown in the drawings the upper corner of the side having the openings 31 and separator 33 therein, is provided with an upstanding finger 35 which is bent in the direction of the line of movement of the said mixing blade. The said scraping finger 35 extends to a point just below the under surface of the cover body portion 15 and scrapes or causes the material on the under side of the cover to be removed and pushed downwardly for remixing. In view of the fact that the material while being mixed has the tendency to move toward the center of the container upon reaching the upper end thereof, upon engaging the under surface of the cover 14, the said material is automatically dropped down into the center of the container for remixing.

In the event a small amount of the material moves inwardly of the scraping finger 35 toward the counter-bore 20 and channel 26, formed thereby, the depending sleeve 21 will prevent it coming within the said counter-bore and channel for interfering with the operation of the device.

In order to rotate the shaft 24 and thereby the mixing paddle or blade 30 the upper end of the said shaft 24, the end thereof above the bearing sleeve 23, is reduced in diameter and externally threaded as at 36 to receive a driving head 37. The driving head 37 is illustrated as provided with a transverse slot 38 adapted to receive a driving mechanism, either associated with a manually operable handle or with a power rotating mechanism such as an electric motor, neither of which driving or operating mechanisms being illustrated in the drawings as they are well-known.

While it is believed the operation of this mechanism is obvious, from the foregoing description and illustration in the drawings, the said operation briefly is as follows:

The investment powder generally, plaster of Paris, and the desired amount of water are introduced into the container 10 through the open upper end thereof whereupon the said open upper end of the container is closed by the cover 14. The vacuum hose nipple 28 is then inserted into the bore 27 and the vacuum or exhaust pump turned on. The vacuum, resulting from the operation of said exhaust pump, is such that it will draw off all air now above the material in the container 10 and whereupon the driving device is connected with the driving head 37 for effecting the rotation of the mixing blade or paddle 30.

It should be noted that the vacuum, created by the exhaust pump, is such that it pulls the cover 14 toward the container 10 for compressing the gasket 17 and thereby preventing any leakage from the exterior of the container into the interior thereof.

As noted above, as the investment materials are being mixed the same is being cut into ribbons and since the said material has a tendency to be centrifugally thrown against the inner surface of the container walls there is centrally of the container an open space and into which the entrapped air of the investment material is drawn for appropriate withdrawal from the container by the exhaust or vacuum forming pump by way of the tip 28 and connecting line thereof. The mixing continues for a prescribed interval of time and which interval of time has been found sufficient to extract all of the gas and air from the investment material so that the said investment material when subsequently employed for the formation of a mold does not permit air bubbles to collect on the surface of the mold pattern and the casting, subsequently obtained from the mold, has a dense and smooth surface free of air bubble pockets and nodules.

From the foregoing it is believed now obvious that there has been provided an investment mixer that accomplishes the objects intially herein set forth.

What is claimed is:

1. In a mixer of the class described the combination of a container having an open upper end, a cover for said container open upper end, said cover having a body portion of sufficient thickness throughout its area for normal operation and including a normal upper and a normal lower surface, a thickened bearing portion substantially axially, centrally of the cover body portion and including an upper portion and a lower portion, respectively, upwardly and downwardly of the normal upper and lower surfaces of the cover body portion with said bearing portion including an upper surface and a lower surface, a mixing paddle or blade shaft rotatably supported by said thickened bearing portion substantially, centrally thereof to depend through the said bearing portion into the interior of the container, a chamber circumferentially and radially, outwardly of the mixing shaft in said thickened bearing portion from the container interior through and upwardly of its lower surface but short of the thickened bearing portion upper surface, a mixing paddle or blade on said shaft within the container for mixing ingredients in said container and thereby releasing air or gas trapped by said ingredients or released by the mixing thereof and which gas or air is collected in the thickened bearing portion chamber, and means connecting said thickened bearing portion chamber to an exhaust pump to exhaust the air and gases within the chamber collected from the interior of the container.

2. In a mixer of the class described and set forth in claim 1, characterized by, said mixing paddle or blade being substantially flat and with its outer edges short of the container wall, and relieved portions in said paddle inwardly from each of its edges being alternately staggered along said edges whereby the paddle on each side of its relieved portions form alternate ridges and hollows in the material in the container to permit gas and air escape into the hollows to the thickened bearing portion chamber.

3. In a mixer of the class described and set forth in claim 1, characterized by, said means exhausting the air and gases in the thickened bearing chamber comprising a port through the thickened bearing portion from the chamber therein to the exterior normal surface of the cover, and a conduit from the exhaust pump and having at its end a nipple removably insertable into the exhaust port from the thickened bearing chamber.

4. In a mixer of the class described and set forth in claim 1, characterized by, said mixing paddle or blade being substantially flat and with its outer edges short of the container wall, relieved portions in said paddle inwardly from each of its edges being alternately staggered along said edges whereby the paddle on each side of its relieved portions form alternate ridges and hollows in the material in the container to permit gas and air escape into the hollows to the thickened bearing portion chamber, said means exhausting the air and gases in the thickened bearing chamber comprising a port through the thickened bearing portion from the chamber therein to the exterior normal surface of the cover, and a conduit from the exhaust pump and having at its end a nipple removably insertable into the exhaust port from the thickened bearing chamber.

5. A mixer of the class described as set forth in claim 1, characterized by, said chamber is formed between the inner wall of a counter-bore of a given diameter, said counter-bore extending upwardly of the lower surface of the thickened bearing portion, and a bearing sleeve for the mixing paddle or blade shaft which has an exterior diameter smaller than the diameter of and radially, inwardly spaced from the wall of the counter-bore.

6. A mixer of the class described as set forth in claim 1, characterized by, said chamber is formed between the inner wall of a counter-bore of a given diameter, said counter-bore extending upwardly of the lower surface of the thickened bearing portion, and a bearing sleeve for the mixing paddle or blade shaft which has an exterior diameter smaller than the diameter of and radially, inwardly, spaced from the wall of the counter-bore, said mixing paddle or blade being substantially flat and with its outer edges short of the container wall, relieved portions in said paddle inwardly from each of its edges being alternately staggered along said edges whereby the paddle on each side of its relieved portions form alternate ridges and hollows in the material in the container to permit gas and air escape into the hollows to the thickened bearing portion chamber, said means exhausting the air and gases in the thickened bearing chamber comprising a port through the thickened bearing portion from the chamber therein to the exterior normal surface of the cover, and a conduit from the exhaust pump and having at its end a nipple removably insertable into the exhaust port from the thickened bearing chamber.

References Cited
UNITED STATES PATENTS

| | | | |
|---|---|---|---|
| 24,770 | 7/1859 | Weaver | 99—272 |
| 2,453,914 | 11/1948 | Hollenback | 259—8 |
| 2,799,947 | 7/1957 | Elwess | 34—92 X |
| 2,973,187 | 2/1961 | Wehmer | 259—108 |
| 3,131,912 | 5/1964 | Steinbock | 259—108 |

WILLIAM I. PRICE, *Primary Examiner.*